United States Patent [19]

McNamara et al.

[11] 3,721,966

[45] March 20, 1973

[54] PLATED WIRE STACK WITH MINIMIZED INTER-BIT COUPLING

[76] Inventors: Joseph P. McNamara, 51 Ft. Meadow Dr., Hudson; Thomas G. Bair, 32 Juniper Brook Rd., Northborough, both of Mass.

[22] Filed: Oct. 20, 1971

[21] Appl. No.: 190,841

[52] U.S. Cl. .340/174 BC, 340/174 M, 340/174 PW, 340/174 TF, 340/174 VA

[51] Int. Cl.......G11c 5/02, G11c 11/04, G11c 11/14

[58] Field of Search...340/174 BC, 174 PW, 174 VA

[56] References Cited

UNITED STATES PATENTS

| | | | |
|---|---|---|---|
| 3,623,032 | 11/1971 | Schapira | 340/174 BC |
| 3,623,035 | 11/1971 | Kobayashi et al. | 340/174 BC |
| 3,267,445 | 8/1966 | Ochsner et al. | 340/174 VA |
| 3,470,545 | 9/1969 | Bonyhard | 340/174 BC |
| 3,490,011 | 1/1970 | Ransom | 340/174 BC |
| 3,553,648 | 1/1971 | Gorman et al. | 340/174 BC |

OTHER PUBLICATIONS

IBM Technical Disclosure Bulletin Vol. 6, No. 4, Sept. 1963 pg. 131.

IBM Technical Disclosure Bulletin – Vol. 8, No. 9, Feb. 1966, pgs. 1263–1264.

IBM Technical Disclosure Bulletin – Vol. 8, No. 9, Feb. 1966, pg. 1278–1279.

*Primary Examiner*—James W. Moffitt

*Attorney*—Richard S. Sciascia et al.

[57] ABSTRACT

A plated wire memory stack includes parallel bit lines and a plurality of conductors perpendicular to the bit lines for carrying "word" currents. Permalloy "-keeper" layers used to shape the word drive fields have a plurality of slots therein which are parallel to the bit lines to minimize inter-bit coupling.

1 Claim, 1 Drawing Figure

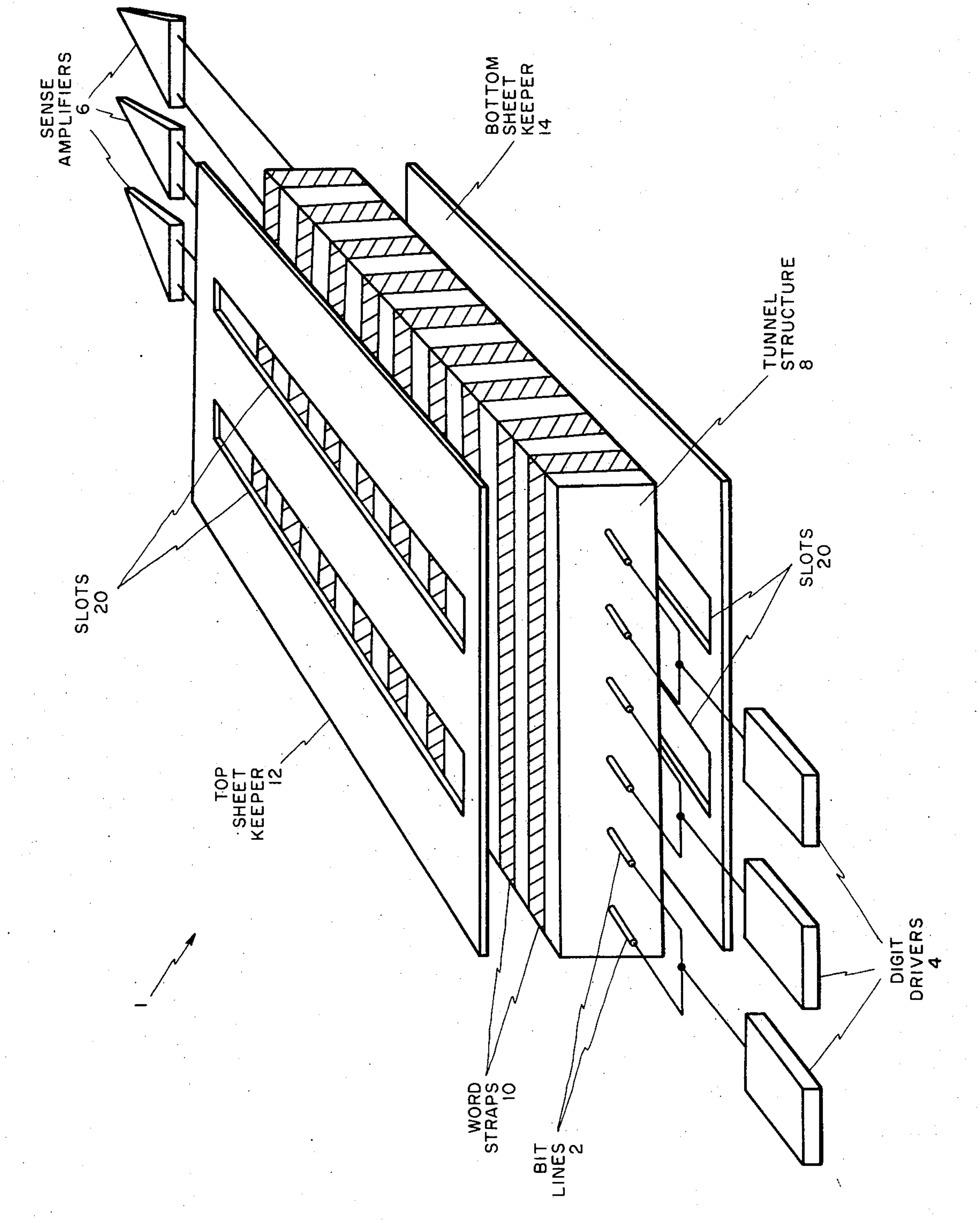
SENSE AMPLIFIERS 6
BOTTOM SHEET KEEPER 14
TUNNEL STRUCTURE 8
SLOTS 20
SLOTS 20
TOP SHEET KEEPER 12
DIGIT DRIVERS 4
WORD STRAPS 10
BIT LINES 2
1

PLATED WIRE STACK WITH MINIMIZED INTER-BIT COUPLING

BACKGROUND OF THE INVENTION

This invention is in the field of plated wire memories. In the prior art, system considerations have in some circumstances required that the bit drive arrangement of a plated wire memory utilize common mode drive. Such a drive scheme is advantageous in some respects but has relatively high and thus objectionable inter-bit coupling. Heretofore, it has been necessary to accept high inter-bit coupling as the price required to obtain the desirable characteristics of common mode drive. Applicants have overcome this problem of the prior art by providing a plated wire memory stack having a common mode drive but without the objectionably high inter-bit coupling which characterized the common mode drive systems of the prior art.

SUMMARY OF THE INVENTION

The invention is a plated wire memory stack embodying a novel arrangement for minimizing the electromagnetic coupling between pairs of bit lines. The memory stack includes parallel bit lines as well as a plurality of conductors perpendicular thereto for carrying "word" currents. Permalloy keepers are used to shape the word drive fields. A plurality of slots are provided in the permalloy keepers. These slots are aligned in a direction parallel to the bit lines to produce the highest wire to wire reluctance path.

DESCRIPTION OF THE DRAWING

The drawing shows a plated wire memory embodying the invention.

DESCRIPTION OF THE PREFERRED EMBODIMENT

In the prior art a common mode drive arrangement for a plated wire memory, such as shown in the drawing, has proven to be advantageous in several respects. Unfortunately such a drive arrangement is characterized by relatively high inter-bit coupling. This is objectionable. The drive bit line elements radiate in phase. This creates a dipole field. Nearby bit lines are configured similarly to the driving line. They serve as efficient receivers of the radiated electromagnetic energy.

In order to minimize the electromagnetic coupling between pairs of bit lines, for a given plated wire stack geometry and bit line spacing, the magnetic paths between pairs should exhibit as high a reluctance as possible. In most stacks, however, a sheet of permalloy is laminated a few mils above and below the bit lines as shown in the drawing. This permalloy keeper is used to shape the word drive fields generated by "word" currents which flow on conductors perpendicular to the bit lines, and closer to them than this keeper layer. The undesired side effect of this sheet keeper is a lowering of the reluctance paths between bit lines and an increase in capacitive coupling between word straps. The latter effect has previously been the subject of much concern throughout the plated wire memory development community and the technique of "slotting" or removing the keeper between adjacent word straps was developed to counter it. When word strap spacings are large, it would appear, at least intuitively, that slotting the keeper parallel to the word strap would reduce the inter-bit coupling problem also.

However, while working with close work strap spacings, 50 mils to 55 mils, it has been found by the inventors that keepers slotted parallel to the word strap do not satisfactorily reduce inter-bit coupling. A radical approach of slotting the keepers parallel to the bit lines was then tried since this would produce the highest possible wire to wire reluctance path. This approach was considered radical because it appears on the surface that it sacrifices, to a large extent, the basic purpose of the keeper, i.e., to provide a low reluctance path over the entire word strap. That is, much of the keeper material over the word straps must be removed when slotting perpendicular to them (parallel to the bit wires). However, the result of the invention is that what is lost in terms of word strap drive efficiency is actually minor compared to the significant reduction in inter-bit coupling. This result was unexpected in light of the prior art.

Although plated wire systems can be organized in such a way that inter-bit coupling is not a problem (differential digit drive, for example), techniques for the minimization of such coupling are important when such organization is not otherwise desirable. A common mode digit drive scheme, for example, can permit faster system operation and the use of cheaper sense amplifiers. Such an organization would normally suffer from severe bit-to bit coupling, however, thus rendering it impractical. Through the use of keepers slotted parallel to the bit lines, such coupling can be reduced to a tolerable level.

The invention is shown in the drawing. Here a plated wire memory stack 1 includes a plurality of bit lines 2 which are connected between digit drivers 4 and sense amplifiers 6. Bit lines 2 pass through a tunnel structure 8. A plurality of word straps 10 are arranged perpendicularly to bit lines 2. A top sheet keeper 12 and a bottom sheet keeper 14 of permalloy are positioned as shown a few mils above and below the bit lines to shape the word drive fields.

The invention comprises the arrangement of a plurality of slots 20 in the top keeper 12 and bottom keeper 14. A slot 20 is located in the keepers between each pair of bit lines 2 and parallel to the bit lines. The dimensions of the slots shown are not necessarily to scale but are chosen for ease of illustration. The exact dimensions and/or configuration for optimum results in a particular application may vary with the size, thickness, material, etc. of the keepers and characteristics of the stack and may be determined by routine experimentation.

What is claimed is:

1. In a plated wire stack memory having a common mode digit drive the improvement comprising:
   - a plurality of bit lines positioned in a plane and parallel to each other,
   - a plurality of word straps arranged in a plane parallel to each other and orthogonal to said bit lines,
   - a top sheet keeper plate positioned above said word straps and said bit lines and in a covering relationship thereto,
   - a bottom sheet keeper plate positioned below said word straps and said bit lines and in a covering relationship thereto, said bit lines being located in a plane below said top keeper plate and above said bottom keeper plate, and spaced apart therefrom, a plurality of slots in said top keeper plate, a plurality of slots in said bottom keeper plate, said slots having a longer dimension aligned parallel to said bit lines, said slots in said upper keeper plate being located above the plane of said bit lines and the slots in said lower keeper plate being located below the plane of said bit lines, said slots each comprising an opening passing completely through one of said keeper plates in order to produce the highest possible wire to wire reluctance path between bit lines while maintaining a relatively low reluctance path over said word straps to thereby reduce inter-bit coupling without seriously impairing word strap drive efficiency.

* * * * *